United States Patent
Phillips et al.

(10) Patent No.: US 7,246,148 B1
(45) Date of Patent: Jul. 17, 2007

(54) ENHANCED NETWORK SERVICES USING A SUBNETWORK OF COMMUNICATING PROCESSORS

(75) Inventors: Stuart G. Phillips, Los Altos, CA (US); Anthony J. Li, Sunnyvale, CA (US); David M. Katz, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 11/134,538

(22) Filed: May 19, 2005

Related U.S. Application Data

(63) Continuation of application No. 10/665,838, filed on Sep. 19, 2003, now Pat. No. 6,917,966, which is a continuation of application No. 09/738,435, filed on Dec. 14, 2000, now Pat. No. 6,640,243, which is a continuation of application No. 08/582,073, filed on Jan. 2, 1996, now Pat. No. 6,182,224.

(60) Provisional application No. 60/004,568, filed on Sep. 29, 1995.

(51) Int. Cl.
  *G06F 15/16* (2006.01)
(52) U.S. Cl. .................... 709/203; 709/217
(58) Field of Classification Search ........ 709/200–203, 709/217–227
See application file for complete search history.

(56) References Cited

U.S. PATENT DOCUMENTS

| | | | | |
|---|---|---|---|---|
| 4,131,767 | A | 12/1978 | Weinstein | 179/170.2 |
| 4,161,719 | A | 7/1979 | Parikh et al. | 340/147 |
| 4,316,284 | A | 2/1982 | Howson | 370/147 |
| 4,397,020 | A | 8/1983 | Howson | 370/105 |
| 4,419,728 | A | 12/1983 | Larson | 364/200 |

(Continued)

FOREIGN PATENT DOCUMENTS

EP  0 384 758  2/1990

(Continued)

OTHER PUBLICATIONS

Allen, M. "*Novell IPX Over Various Wan Media (IPXWAN)*", Network Working Group, RFC 1551, Dec. 1993, pp. 1-22.

(Continued)

*Primary Examiner*—Moustafa M. Meky
(74) *Attorney, Agent, or Firm*—Beyer Weaver, LLP

(57) ABSTRACT

A method and system for providing enhanced services for a network. The enhanced services use information about the network which is available to a subnet of communicating processors (such as a set of routers), collectively executing a common distributed technique for disseminating that network information. The router subnet collects network topology information and provides a service using that network topology information, responsive to requests from non-routers coupled to the network (such as a set of host processors). The router subnet also collects information advertised by hosts coupled to the network, and disseminates that host information to substantially all routers, using the common distributed technique for disseminating network topology information. The host information may comprise information about server processes available at the originating host (such as what services are available and to which users those services are available), or may comprise information about client processes operating at the originating host (such as which users are operating those client processes and which services they desire).

50 Claims, 8 Drawing Sheets

U.S. PATENT DOCUMENTS

| | | | | |
|---|---|---|---|---|
| 4,424,565 A | 1/1984 | Larson | ................ | 364/200 |
| 4,437,087 A | 3/1984 | Petr | ................ | 340/347 DD |
| 4,438,511 A | 3/1984 | Baran | ................ | 370/19 |
| 4,439,763 A | 3/1984 | Limb | ................ | 340/825.5 |
| 4,445,213 A | 4/1984 | Baugh et al. | ................ | 370/94 |
| 4,446,555 A | 5/1984 | Devault et al. | ................ | 370/94 |
| 4,456,957 A | 6/1984 | Schieltz | ................ | 364/200 |
| 4,464,658 A | 8/1984 | Thelen | ................ | 340/825.5 |
| 4,499,576 A | 2/1985 | Fraser | ................ | 370/60 |
| 4,506,358 A | 3/1985 | Montgomery | ................ | 370/60 |
| 4,507,760 A | 3/1985 | Fraser | ................ | 365/221 |
| 4,532,626 A | 7/1985 | Flores et al. | ................ | 370/85 |
| 4,644,532 A | 2/1987 | George et al. | ................ | 370/94 |
| 4,646,287 A | 2/1987 | Larson et al. | ................ | 370/60 |
| 4,677,423 A | 6/1987 | Benvenuuto et al. | ................ | 340/347 |
| 4,679,189 A | 7/1987 | Olsen et al. | ................ | 370/60 |
| 4,679,227 A | 7/1987 | Hughes-Hartogs | ................ | 379/98 |
| 4,723,267 A | 2/1988 | Jones et al. | ................ | 379/93 |
| 4,731,816 A | 3/1988 | Hughes-Hartogs | ................ | 379/98 |
| 4,750,136 A | 6/1988 | Arpin et al. | ................ | 364/514 |
| 4,757,495 A | 7/1988 | Decker et al. | ................ | 370/76 |
| 4,763,191 A | 8/1988 | Gordon et al. | ................ | 358/86 |
| 4,769,810 A | 9/1988 | Eckberg, Jr. et al. | ................ | 370/60 |
| 4,769,811 A | 9/1988 | Eckberg, Jr. et al. | ................ | 370/60 |
| 4,771,425 A | 9/1988 | Baran et al. | ................ | 370/85 |
| 4,819,228 A | 4/1989 | Baran et al. | ................ | 370/85 |
| 4,827,411 A | 5/1989 | Arrowood et al. | | |
| 4,833,706 A | 5/1989 | Hughes-Hartogs | ................ | 379/98 |
| 4,835,737 A | 5/1989 | Herrig et al. | ................ | 364/900 |
| 4,879,551 A | 11/1989 | Georgiou et al. | ................ | 340/825.87 |
| 4,893,306 A | 1/1990 | Chao et al. | ................ | 370/94.2 |
| 4,903,261 A | 2/1990 | Baran et al. | ................ | 370/94.2 |
| 4,922,486 A | 5/1990 | Lidinsky et al. | ................ | 370/60 |
| 4,933,937 A | 6/1990 | Konishi | ................ | 370/85.13 |
| 4,960,310 A | 10/1990 | Cushing | ................ | 350/1.7 |
| 4,962,497 A | 10/1990 | Ferenc et al. | ................ | 370/60.1 |
| 4,962,532 A | 10/1990 | Kasiraj et al. | ................ | 380/25 |
| 4,965,767 A | 10/1990 | Kinoshita et al. | | |
| 4,965,772 A | 10/1990 | Daniel et al. | | |
| 4,970,678 A | 11/1990 | Sladowski et al. | ................ | 364/900 |
| 4,980,897 A | 12/1990 | Decker et al. | ................ | 375/38 |
| 4,991,169 A | 2/1991 | Davis et al. | ................ | 370/77 |
| 5,003,595 A | 3/1991 | Collins et al. | ................ | 380/25 |
| 5,014,265 A | 5/1991 | Hahne et al. | ................ | 370/60 |
| 5,020,058 A | 5/1991 | Holden et al. | ................ | 370/190 |
| 5,033,076 A | 7/1991 | Jones et al. | ................ | 379/67 |
| 5,034,919 A | 7/1991 | Sassai et al. | | |
| 5,054,034 A | 10/1991 | Hughes-Hartogs | ................ | 375/8 |
| 5,059,925 A | 10/1991 | Weisbloom | ................ | 331/1 A |
| 5,072,449 A | 12/1991 | Enns et al. | ................ | 371/37.1 |
| 5,088,032 A | 2/1992 | Bosack | ................ | 395/200 |
| 5,095,480 A | 3/1992 | Fenner | ................ | 370/94.1 |
| RE33,900 E | 4/1992 | Howson | ................ | 370/105 |
| 5,115,431 A | 5/1992 | Williams et al. | ................ | 370/94.1 |
| 5,128,945 A | 7/1992 | Enns et al. | ................ | 371/37.1 |
| 5,136,580 A | 8/1992 | Videlock et al. | ................ | 370/60 |
| 5,166,930 A | 11/1992 | Braff et al. | ................ | 370/94.1 |
| 5,199,049 A | 3/1993 | Wilson | ................ | 375/104 |
| 5,206,886 A | 4/1993 | Bingham | ................ | 375/97 |
| 5,208,811 A | 5/1993 | Kashio et al. | | |
| 5,212,686 A | 5/1993 | Joy et al. | ................ | 370/60 |
| 5,224,099 A | 6/1993 | Corbalis et al. | ................ | 370/94.2 |
| 5,226,120 A | 7/1993 | Brown et al. | ................ | 395/200 |
| 5,228,062 A | 7/1993 | Bingham | ................ | 375/97 |
| 5,229,994 A | 7/1993 | Balzano et al. | ................ | 370/85.13 |
| 5,237,564 A | 8/1993 | Lespagnol et al. | ................ | 370/60.1 |
| 5,241,682 A | 8/1993 | Bryant et al. | ................ | 395/800 |
| 5,243,342 A | 9/1993 | Kattemalalavadi et al. | ................ | 341/106 |
| 5,243,596 A | 9/1993 | Port et al. | ................ | 370/94.1 |
| 5,247,516 A | 9/1993 | Bernstein et al. | ................ | 370/82 |
| 5,249,178 A | 9/1993 | Kurano et al. | ................ | 370/60 |
| 5,253,251 A | 10/1993 | Aramaki | | |
| 5,255,291 A | 10/1993 | Holden et al. | ................ | 375/111 |
| 5,260,933 A | 11/1993 | Rouse | ................ | 370/14 |
| 5,260,978 A | 11/1993 | Fleisher et al. | ................ | 375/106 |
| 5,268,592 A | 12/1993 | Bellamy et al. | ................ | 307/94.1 |
| 5,268,900 A | 12/1993 | Hluchyj et al. | ................ | 370/94.1 |
| 5,271,004 A | 12/1993 | Proctor et al. | ................ | 370/60 |
| 5,274,631 A | 12/1993 | Bhardwaj | ................ | 370/60 |
| 5,274,635 A | 12/1993 | Rahman et al. | ................ | 370/60.1 |
| 5,274,643 A | 12/1993 | Fisk | ................ | 370/94.1 |
| 5,280,470 A | 1/1994 | Buhrke et al. | ................ | 370/13 |
| 5,280,480 A | 1/1994 | Pitt et al. | ................ | 370/85.13 |
| 5,280,500 A | 1/1994 | Mazzola et al. | ................ | 375/17 |
| 5,283,783 A | 2/1994 | Nguyen et al. | ................ | 370/16.1 |
| 5,287,103 A | 2/1994 | Kasprzyk et al. | ................ | 340/825.52 |
| 5,287,453 A | 2/1994 | Roberts | ................ | 395/200 |
| 5,291,482 A | 3/1994 | McHarg et al. | ................ | 370/60 |
| 5,305,311 A | 4/1994 | Lyles | ................ | 370/60 |
| 5,307,343 A | 4/1994 | Bostica et al. | ................ | 370/60 |
| 5,311,509 A | 5/1994 | Heddes et al. | | |
| 5,313,454 A | 5/1994 | Bustini et al. | ................ | 370/13 |
| 5,313,582 A | 5/1994 | Hendal et al. | ................ | 395/250 |
| 5,317,562 A | 5/1994 | Nardin et al. | ................ | 370/16 |
| 5,319,644 A | 6/1994 | Liang | ................ | 370/85.5 |
| 5,327,421 A | 7/1994 | Hiller et al. | ................ | 370/60.1 |
| 5,331,637 A | 7/1994 | Francis et al. | ................ | 370/54 |
| 5,345,445 A | 9/1994 | Hiller et al. | ................ | 370/60.1 |
| 5,345,446 A | 9/1994 | Hiller et al. | ................ | 370/60.1 |
| 5,359,592 A | 10/1994 | Corbalis et al. | ................ | 370/17 |
| 5,361,250 A | 11/1994 | Nguyen et al. | ................ | 370/16.1 |
| 5,361,256 A | 11/1994 | Doeringer et al. | ................ | 370/60 |
| 5,361,259 A | 11/1994 | Hunt et al. | ................ | 370/84 |
| 5,365,524 A | 11/1994 | Hiller et al. | ................ | 370/94.2 |
| 5,367,517 A | 11/1994 | Cidon et al. | ................ | 370/54 |
| 5,371,852 A | 12/1994 | Attanasio et al. | ................ | 395/200 |
| 5,386,567 A | 1/1995 | Lien et al. | ................ | 395/700 |
| 5,390,170 A | 2/1995 | Sawant et al. | ................ | 370/58.1 |
| 5,390,175 A | 2/1995 | Hiller et al. | ................ | 370/60 |
| 5,394,394 A | 2/1995 | Crowther et al. | ................ | 370/60 |
| 5,394,402 A | 2/1995 | Ross | ................ | 370/94.1 |
| 5,400,325 A | 3/1995 | Chatwani et al. | ................ | 370/60.1 |
| 5,408,469 A | 4/1995 | Opher et al. | ................ | 370/60.1 |
| 5,416,842 A | 5/1995 | Aziz | ................ | 380/30 |
| 5,422,880 A | 6/1995 | Heitkamp et al. | ................ | 370/60 |
| 5,422,882 A | 6/1995 | Hiller et al. | ................ | 370/60.1 |
| 5,423,002 A | 6/1995 | Hart | ................ | 395/200 |
| 5,426,636 A | 6/1995 | Hiller et al. | ................ | 370/60.1 |
| 5,428,607 A | 6/1995 | Hiller et al. | ................ | 370/60.1 |
| 5,430,715 A | 7/1995 | Corbalis et al. | ................ | 370/54 |
| 5,442,457 A | 8/1995 | Najafi | ................ | 385/400 |
| 5,442,630 A | 8/1995 | Gagliardi et al. | ................ | 370/85.13 |
| 5,452,297 A | 9/1995 | Hiller et al. | ................ | 370/60.1 |
| 5,473,599 A | 12/1995 | Li et al. | ................ | 370/16 |
| 5,473,607 A | 12/1995 | Hausman et al. | ................ | 370/85.13 |
| 5,477,541 A | 12/1995 | White et al. | | |
| 5,485,455 A | 1/1996 | Dobbins et al. | | |
| 5,490,140 A | 2/1996 | Abensour et al. | | |
| 5,490,258 A | 2/1996 | Fenner | ................ | 395/401 |
| 5,491,687 A | 2/1996 | Christensen et al. | ................ | 370/17 |
| 5,491,804 A | 2/1996 | Heath et al. | ................ | 395/275 |
| 5,497,368 A | 3/1996 | Reijnierse et al. | | |
| 5,504,747 A | 4/1996 | Sweasey | | |
| 5,509,006 A | 4/1996 | Wilford et al. | ................ | 370/60 |
| 5,513,314 A | 4/1996 | Kandasamy et al. | ................ | 214/6 |
| 5,517,494 A | 5/1996 | Green | | |
| 5,519,704 A | 5/1996 | Farinacci et al. | ................ | 370/85.13 |
| 5,526,489 A | 6/1996 | Nilakantan et al. | ................ | 395/200.02 |
| 5,530,963 A | 6/1996 | Moore et al. | ................ | 395/200.15 |
| 5,535,195 A | 7/1996 | Lee | ................ | 370/54 |
| 5,539,734 A | 7/1996 | Burwell et al. | | |
| 5,555,244 A | 9/1996 | Gupta et al. | | |
| 5,561,669 A | 10/1996 | Lenney et al. | ................ | 370/60.1 |
| 5,583,862 A | 12/1996 | Callon | ................ | 370/397 |

| | | | | | | |
|---|---|---|---|---|---|---|
| 5,592,470 | A | 1/1997 | Rudrapatna et al. | ......... | 370/320 |
| 5,598,532 | A | 1/1997 | Liron | ......... | 709/220 |
| 5,598,581 | A | 1/1997 | Daines et al. | ......... | 395/872 |
| 5,600,798 | A | 2/1997 | Cherukuri et al. | | |
| 5,602,770 | A | 2/1997 | Ohira | | |
| 5,604,868 | A | 2/1997 | Komine et al. | | |
| 5,608,726 | A | 3/1997 | Virgile | | |
| 5,617,417 | A | 4/1997 | Saithe et al. | ......... | 370/394 |
| 5,617,421 | A | 4/1997 | Chin et al. | ......... | 370/402 |
| 5,630,125 | A | 5/1997 | Zellweger | ......... | 395/614 |
| 5,631,908 | A | 5/1997 | Saxe | | |
| 5,632,021 | A | 5/1997 | Jennings et al. | ......... | 395/309 |
| 5,634,010 | A | 5/1997 | Ciscon et al. | ......... | 395/200.68 |
| 5,638,359 | A | 6/1997 | Peltola et al. | | |
| 5,644,718 | A | 7/1997 | Belove et al. | ......... | 395/200.68 |
| 5,659,684 | A | 8/1997 | Giovannoni et al. | | |
| 5,666,353 | A | 9/1997 | Klausmeier et al. | | |
| 5,673,265 | A | 9/1997 | Gupta et al. | | |
| 5,678,006 | A | 10/1997 | Valizadeh et al. | | |
| 5,684,797 | A | 11/1997 | Aznar et al. | ......... | 370/390 |
| 5,687,324 | A | 11/1997 | Green et al. | | |
| 5,689,506 | A | 11/1997 | Chiussi et al. | ......... | 370/388 |
| 5,694,390 | A | 12/1997 | Yamato et al. | | |
| 5,724,351 | A | 3/1998 | Chao et al. | | |
| 5,740,097 | A | 4/1998 | Satch | | |
| 5,748,186 | A | 5/1998 | Raman | ......... | 345/302 |
| 5,748,617 | A | 5/1998 | McLain, Jr. | | |
| 5,754,547 | A | 5/1998 | Nakazawa | | |
| 5,835,710 | A | 11/1998 | Nagami et al. | | |
| 5,838,912 | A | 11/1998 | Poon et al. | ......... | 709/204 |
| 5,841,874 | A | 11/1998 | Kemple et al. | | |
| 5,854,903 | A | 12/1998 | Morrison et al. | | |
| 5,898,686 | A | 4/1999 | Virgile | | |
| 5,937,162 | A | 8/1999 | Funk et al. | ......... | 709/206 |
| 6,970,952 | B2 * | 11/2005 | Motoyama | ......... | 710/15 |

FOREIGN PATENT DOCUMENTS

| | | |
|---|---|---|
| EP | 0 431 751 A1 | 11/1990 |
| EP | 0/567 217 A2 | 10/1993 |
| WO | WO 93/07569 | 4/1993 |
| WO | WO 93/07692 | 4/1993 |
| WO | WO 94/01828 | 1/1994 |
| WO | WO 95/20850 | 8/1995 |

OTHER PUBLICATIONS

Becker D., "*3c589.c: A 3c589 Etherlink3 Ethernet Driver For Linux*", beccker@CESDIS.gsfc.nasa.gov, May 3, 1994, pp. 1-13.

Pei, et al., "*Putting Routing Tables in Silicon*", IEEE Network Magazine, Jan. 1992, pp. 42-50.

Perkins, D., "*Requirements for an Internet Standard Point-to Point Protocol*", Network Working Group, RFC 1547, Dec. 1993, pp. 1-19.

Simpson, W., "*The Point-to -Point Protocol (PPP)*", Network Working Group, RFC 1548, Dec. 1993, pp. 1-53.

Tusuchiya,, P.F., "*A Search Algorithm for Table Entries with NonContinguous Wildcarding*", Abract, Bellcore.

Esaki, et al., "*Datagram Delivery in an ATM-Internet*", IEICE Transactions on Communications vol. E77-B, No. 3, (1994) Mar., Tokyo, Japan.

Chowdhury, et al., "*Alternative Bandwidth Allocation Algorithm for Packet Video in ATM Networks*," 1992, IEEE Infocom 92, pp. 1061-1068.

Zhang,et al., "*Rate-Controlled Static-Priority Queuing*", 1993, IEEE, pp. 227-236.

Doeringer, et al., "*Routing on Longest-Matching Prefixes*", IBM, "*Method and Apparatus for the Statistical Multiplexing of Voice, Data and Image Signals*", Nov. 1992, IBM Technical Data Bulletin n6 11-92, pp. 409-411.

IBM Corporation, "*Method and Apparatus for the Statistical Multiplexing of Voice Data and Image Signals*", IBM Technical Disclosure Bulletin, No. 6, Nov. 1992, pp. 409-411.

* cited by examiner

ENHANCED NETWORK SERVICES USING A SUBNETWORK OF COMMUNICATING PROCESSORS

CROSS-REFERENCE TO RELATED APPLICATIONS

This application is a continuation of application Ser. No. 10/665,838, filed Sep. 19, 2003, now U.S. Pat. No. 6,917,966 which is a continuation of application Ser. No. 09/738,435, filed Dec. 14, 2000, now U.S. Pat. No. 6,640,243 which is a continuation of application Ser. No. 08/582,073, filed Jan. 2, 1996, now U.S. Pat. No. 6,182,224, which claims the benefit of U.S. Provisional Application No. 60/004,568, filed Sep. 29, 1995, wherein the disclosure of each application is hereby incorporated by reference.

BACKGROUND OF THE INVENTION

1. Field of the Invention

This invention relates to enhanced network services using a subnetwork of communicating processors.

2. Description of Related Art

A computer network having more than one possible message delivery path, such as for example a network of computer networks (an "internetwork"), generally comprises a set of processors which have the task of routing each message from its source to its destination. These processors (herein called "routers", but sometimes called "bridges", "brouters", or other terms) generally interoperate using a common distributed routing technique. For example, (1) routers generally exchange information about routing conditions in the network, so as to globally inform all routers of conditions which are detected locally, (2) routers generally each route messages according to the same techniques using the same routing technique.

The collection of routers (herein called the "subnet" of routers) thus has access to a rich collection of distributed information about the status of the network needed for routing messages therein, including detailed and up-to-date information about the network topology, relative distance measures in the network, administrative policies in force in the network (such as, for example, network "firewalls" or routers which will route only a subset of messages), and other information. It would be advantageous to provide at least some of this distributed information to applications which might use it to provide enhanced services. Examples of such enhanced services, and how they would be provided, are described herein.

The router subnet also provides a powerful and available resource for distributing other information, not strictly required for the task of routing messages in the network, such as, for example, relative load at each host in the network. It would be advantageous to disseminate this information and provide at least some of it to applications which might use it to provide enhanced services. Examples of such enhanced services, and how they would be provided, are described herein.

Accordingly, it would be advantageous to provide a method and system for enhanced network services using a subnetwork of communicating processors.

The following U.S. patent(s) or other documents may be pertinent:

R. Srinivasan, "RPC: Remote Procedure Call Protocol Specification Version 2", Network Working Group RFC 1831 (August 1995).

The pertinence of the related art will also be apparent to those skilled in the art after perusal of this application.

SUMMARY OF THE INVENTION

The invention provides a method and system for providing enhanced services for a network, using a subnetwork of communicating processors. The enhanced services use information about the network which is available to the subnet of communicating processors (such as a set of routers), interoperating using a common distributed technique for disseminating that network information. In a first aspect of the invention, the router subnet collects network topology information and provides a service using that network topology information, responsive to requests from non-routers (such as host processors) coupled to the network. The network topology information comprises information about paths and routes, including bandwidth, connectivity, delay, traffic reservations, and administrative policies applicable to those paths and routes. Routers providing the enhanced service have the option of requiring authentication for service requests.

For a first example, the router subnet provides an enhanced distributed naming service which, in addition to translating server names into host addresses, also orders those host addresses by relative distance in the network, or by another criterion designated by the client. For a second example, the router subnet provides an enhanced message delivery service which, in addition to delivering a message to a plurality of destinations, assures that all destinations receive the message at substantially the same time.

In a second aspect of the invention, the router subnet collects information advertised by hosts coupled to the network, and disseminates that host information to substantially all routers, using the common distributed technique for disseminating network topology information. In a first preferred embodiment, the host information comprises information about server processes available at the originating host (such as what services are available and to which users those services are available). In a second preferred embodiment, the host information comprises information about client processes operating at the originating host (such as which users are operating those client processes and which services they desire).

For a first example, hosts advertise their relative load for dissemination by the router subnet, and the router subnet provides an enhanced distributed naming service which, in addition to translating server names into host addresses, also orders those host addresses by relative load (or by both relative distance and relative load). Similarly, hosts may also advertise other server information, such as cost for performing the service, delay in performing the service, or other administrative policies which would affect the choice of server.

For a second example, hosts advertise their logged-in users for dissemination by the router subnet, and the router subnet provides an enhanced message-delivery service which, in addition to receiving messages for delivery, also delivers those messages to the host where the destination user is logged-in. Similarly, hosts may also advertise other client information, such as willingness to pay for performing a designated service, which the router subnet may disseminate for responses by servers or by other clients.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

Providing Enhanced Network Services

Figure 1A:
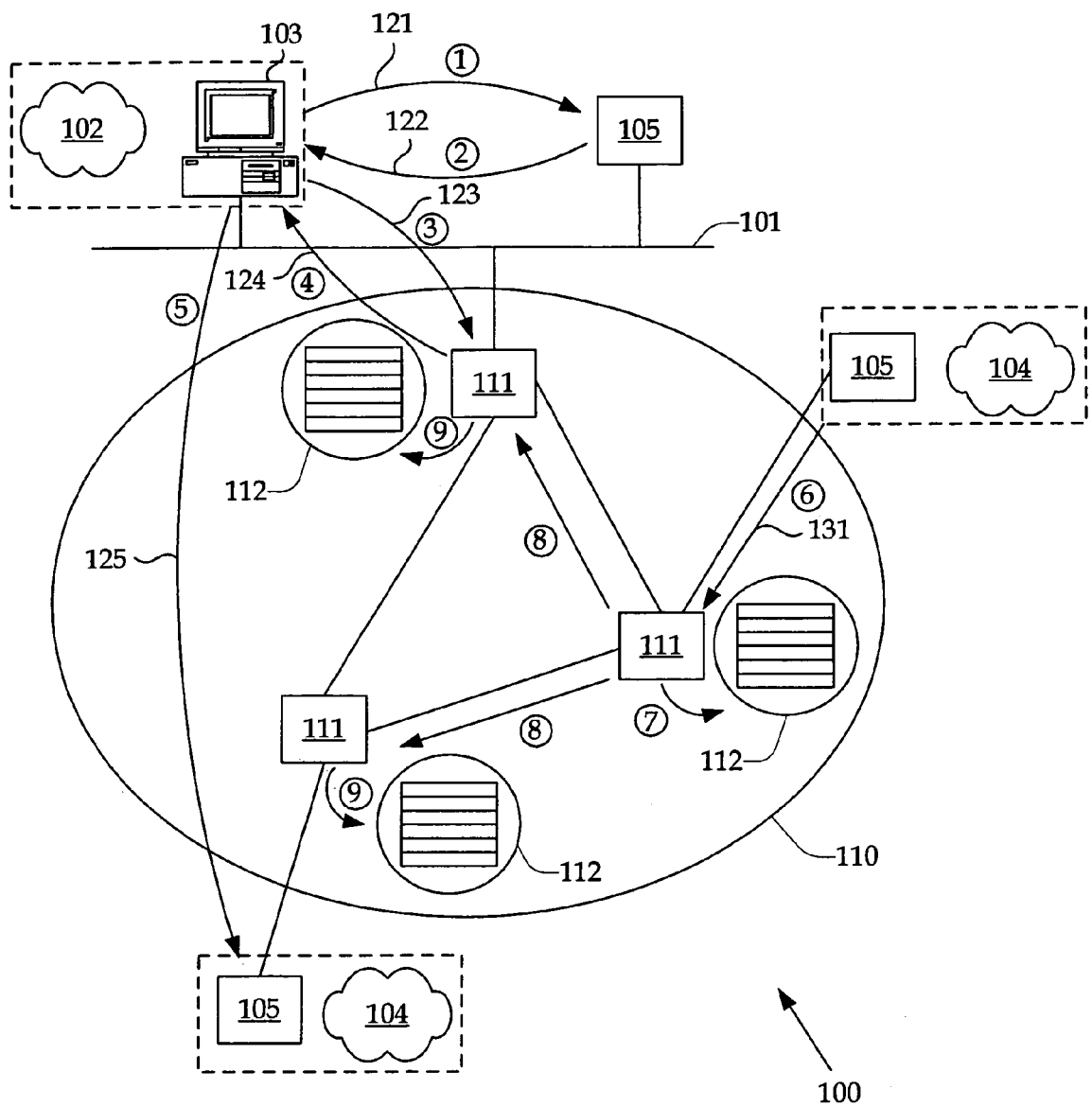
FIG. 1A shows a block diagram of a system for providing enhanced services, and also shows a block diagram of a system for providing enhanced services using server advertisements, in a computer network.
Figure 1B:
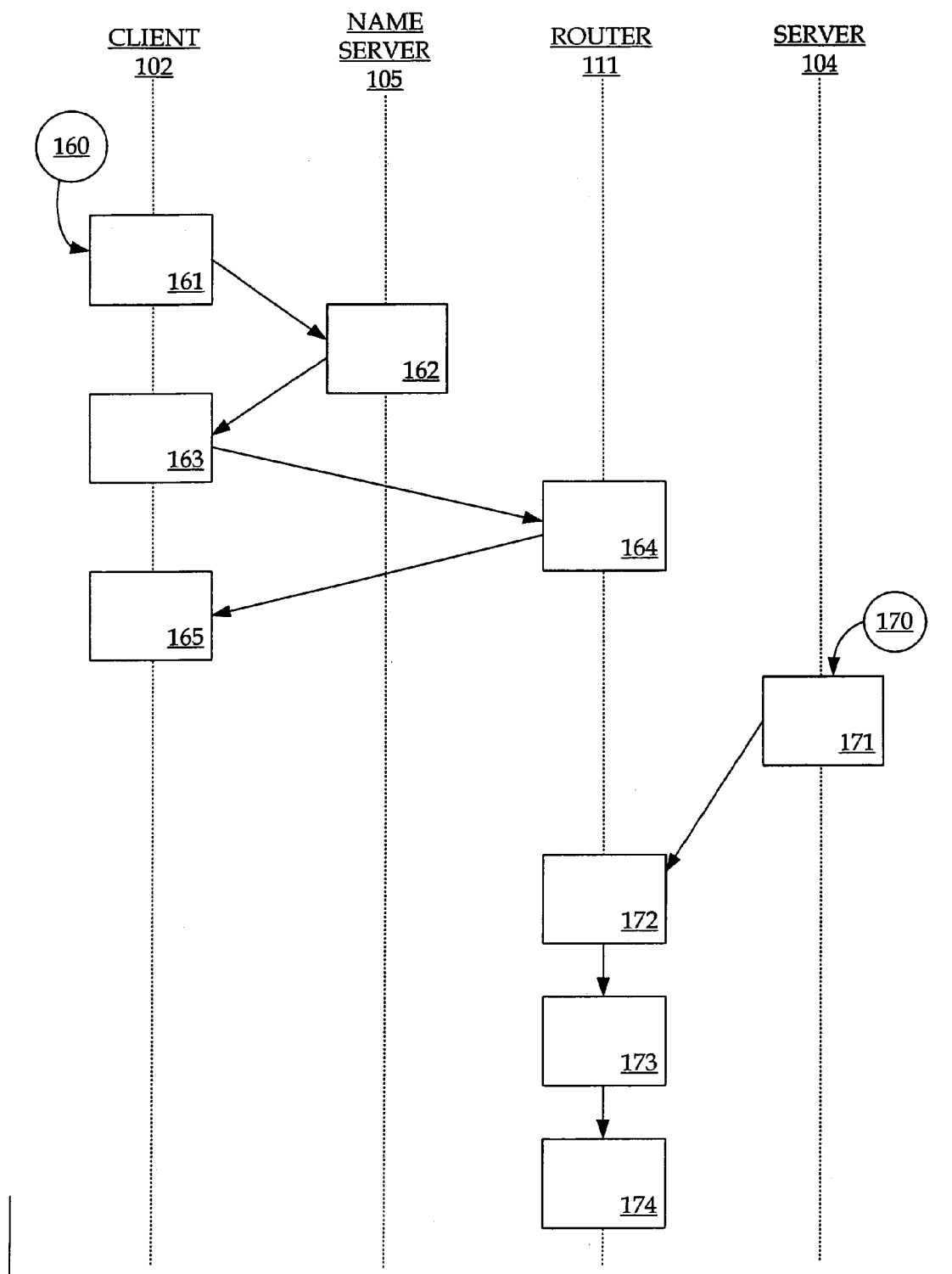
FIG. 1B shows a flow diagram of a method for providing enhanced services, and also shows a flow diagram of a method for providing enhanced services using server advertisements in a computer network as shown in FIG. 1A.

FIG. 1A shows a block diagram of a system for providing enhanced services, in a computer network. FIG. 1B shows a flow diagram of a method for providing enhanced services, in a computer network as shown in FIG. 1A.

In an internetwork 100 to which a network 101 is coupled, a client process 102 on a client node 103 contacts a server process 104 on a server node 105, to obtain data or a service. For example, the data may comprise a file located at the server node 105; the service may comprise conducting a computation, providing data in response to search parameters, or even just providing the current time.

The verb "contacts" refers to communication between the client process 102 and the server process 104 using messages comprising message packets which are transmitted using the internetwork 100 between the client process 102 and the server process 104. Messages and message packets are transmitted using the internetwork 100 using a subnet 110 of routers 111. Each router 111 executes a routing technique which causes the routers 111 to collectively inter-operate using a common distributed technique for routing messages and distributing information about the internetwork 100. This network information is stored at each router 111 in one or more network tables 112, and generally comprises information about paths and routes, such as bandwidth, connectivity, delay, traffic reservations, and administrative policies applicable to those paths and routes. Particular routing techniques, such as IGRP, AppleTalk, and IPX, are known in the art of networking.

A method 150 is conducted in cooperation by various nodes and processes coupled to the internetwork 100. At a flow point 160 for the method 150, the client process 102 desires to contact a server process 104, the latter of which is coupled to the internetwork 100.

At a step 161, the client process 102 first contacts a name server 105, which preferably comprises a server process 104 executing on a server node 103 for which the client process 102 already has a network address, using a name-request message 121. In this example, the name server 105 is shown executing on a different node and coupled to the same network 101 as the client node 103, but there is no particular requirement that the name server 105 is in fact so disposed. For example, the name server 105 may be located at the same node as the client process 102, or may be coupled to a different network 101 on the internetwork 100, so long as the client process 102 has available to it a sufficient network address to transmit the name-request message 121 to the name server 105.

In a preferred embodiment, the name server 105 comprises a DNS name server operating according to the DNS protocol.

The name-request message 121 asks the name server 105 to translate an identifier for the service provided into a network address for a server process 104 providing that service. For example, the identifier may comprise a host name for a node coupled to the internetwork 100, such as "sanjose.cisco.com", and the name server 105 may translate that host name into an IP address for that node, such as "3.141.59.26".

At a step 162, the name server 105 receives the name-request message 121, parses the name-request message 121 to determine the name to be translated, looks up the name in a table it maintains for translating names into network addresses, and transmits a name-response message 122 comprising one or more network addresses to the client process 102 at the client node 103.

In general, the name to be translated may specify a service which is provided by more than one server process 104 or by more than one server node 105, so that the name server 105 has more than one network address to provide in the name-response message 122. In a preferred embodiment, the name server 105 provides all such network addresses in the name-response message 122. Order is not critical at this flow point of the method 150.

At a step 163, the client process 102 receives the name-response message 122 and parses the name-response message 122 to determine the network addresses provided by the name server 105. The client process 102 then contacts a router 111 using an order-request message 123.

The order-request message 123 asks the router 111 to order a set of addresses by their relative distance on the internetwork 100. Preferably, the client process 102 packages the addresses from the name-response message 122 into the order-request message 123.

At a step 164, the router 111 receives the order-request message 123, parses the order-request message 123 to determine the set of addresses, looks up each address in its network tables 112 to determine a relative distance for that network address, orders the network addresses by relative distance, and transmits an order-response message 124 comprising the network addresses ordered relative distance.

The relative distance for each network address may differ at different times, so the order provided by the router 111 in the order-response message 124 may also differ in response to order-request messages 123 transmitted at different times.

In a preferred embodiment, the relative distance for each network address is computed in response to the expected time delay in delivering a message from the client node 103 to the server node 105. It is expected that this expected time delay will be nearly the same as the expected time delay from the name server 105. In alternative embodiments described below in which the name server 105 orders the addresses in response to relative distance information from the router 111, the ordering may turn out to differ from an ordering for the client node 103, but this is not expected to be important unless the name server 105 is at a substantial relative distance from the client node 103.

In alternative embodiments, the relative distance for each network address may also be computed in response to other information available to the router 111 in its network tables 112, including for example (1) an expected bandwidth of a path from the client node 103 to the server node 105, (2) any traffic reservations on paths between the client node 103 to the server node 105, or (3) any administrative policies applicable to those paths between the client node 103 to the server node 105. For example, if a required path to one of the server nodes 105 is known to the router 111 to be heavily trafficked between the hours of 9:00 a.m. and 5:00 p.m., that server node 105 may be assigned a substantially higher relative distance responsive to that information.

Although in a preferred embodiment, the name-request message 121 and the order-request message 123 are both preferably transmitted by the client process 102, in alternative embodiments, alternative arrangements are possible which would obtain the same information for the client process 102. Such alternative arrangements would be clear to those skilled in the art after perusing this application, and are within the scope and spirit of the invention. In a first alternative embodiment, the name server 105 may obtain an ordering of network addresses from the router 111, and may order the network addresses in the name-response message 122. To do so, the name server 105 may transmit an order-request message 123 to the router 111 and use the results it receives in the order-response message 124. In a second alternative embodiment, the name server 105 may be located at the router 111, and may order the network addresses in the name-response message 122 in response to direct access to the network tables 112.

In a preferred embodiment, the network address for one or more particular server nodes 105 may be restricted to those client processes 102 with sufficient authorization. In such a case, the name server 105 would require that the client process 102 is authenticated, to determine that the name-request message 121 really comes from the client process 102 and not someone else, and that the client process 102 has sufficient permissions, in particular, that the name server 105 has been informed that the client process 102 is authorized to receive that information. A preferred authentication process is described below with reference to FIG. 4.

In a preferred embodiment, the relative distance or other ordering information may also be restricted to those client processes 102 with sufficient authorization. In such a case, the router 111 would require that the client process 102 is authenticated, to determine that the name-request message 121 really comes from the client process 102 and not someone else, and that the client process 102 has sufficient permissions, in particular, that the router 111 has been informed that the client process 102 is authorized to receive that information.

In some cases, the router 111 may have insufficient information to respond to the order-request message 123 on its own. In such a case, the router 111 may forward the order-request message 123 (or another message with similar information) to a second router 111. The second router 111 may also find that it must forward the order-request message 123 or other message, until one or more routers are reached which, individually or collectively, do have sufficient information to respond to the original order-request message 123.

At a step 165, the client process 102 selects a first one of the network addresses, preferably the network address with the smallest relative distance, and contacts the server process 104 on the server node 105 with that network address. In the case that the client process 102 is unable to contact the server process 104 at the first network address, the client process 102 selects another, preferably the network address with the next smallest relative distance, and contacts the server process 104 on the server node 105 with that network address. The client process 102 repeats this step until one of the server processes 104 is contacted or the set of network addresses is exhausted.

Automated Resource Distribution

A first example enhanced network service is automated distribution of resources such as services. Some services are readily distributed by providing more than one service provider, each of which can fully provide substantially the same service. For example, a service providing a collection of data may be duplicated by copying the data to multiple sites; a service providing a program to be executed may be duplicated by copying the program to multiple sites, and providing resources for executing the program at each of those sites.

In this example enhanced service, a resource to be automatically distributed is embodied in server processes 104 at a plurality of server nodes 105. For example, the resource may comprise one of the following:

- an FTP directory, such as a directory of files which may be copied from the server node 105 to the client node 103 using the "FTP" protocol;
- a network news server, such as a server for providing messages posted to "network news" or to a bulletin board system, and distributed substantially throughout a portion of the internetwork 100;
- a World Wide Web page, such as a file comprising a set of data to be displayed, possibly including text, graphics, display commands, or motion picture data, and comprising one or more hypertext links to other such files;
- a database and search engine, such as a program for receiving search requests, executing those search requests against a database, and providing the results of such search requests; or
- a time server, such as a program for providing a time of day or similar globally available information, such as a dictionary server, spell-checker or thesaurus.

Other and further possibilities will readily occur to those skilled in the art after perusal of this application; such other and further possibilities would not require invention or undue experiment, and are within the scope and spirit of the invention.

The name servers 105 which translate the service name into network addresses are given the network addresses for the plurality of server nodes 105 at which the server processes 104 may be found. This information is distributed to the name servers 105 using a name server protocol such as the DNS protocol. Name server protocols are known in the art of networking, and so are not discussed in detail herein.

Duplicating the server process 104 and distributing multiple network addresses for the service to the name servers 105 has the following effects: When the name-request message 121 is transmitted at the step 161 from the client process 102 to the name server 105, the name server 105 obtains a plurality of network addresses for server processes 104 at a plurality of server nodes 105. When the order-request message 123 is transmitted at the step 163 from the client process 102 to the router 111, the router 111 orders the plurality of network addresses for server processes 104 at a plurality of server nodes 105 by their relative distance from the client node 103. When the client process 102 contacts a server process 104 using a network address from the order-response message 124, the server process 104 which is chosen is the one at the server node 105 with the smallest relative distance from the client node 103.

Thus, when the client process 102 initiates the method 150 to contact one of the server processes 104, it will automatically be assigned to the relatively nearest server process 104; when multiple client process 102 attempt to contact one of the server processes 104, they will automatically be distributed among the set of server processes 104 which may be chosen.

Synchronized Message Receipt

Figure 2A:
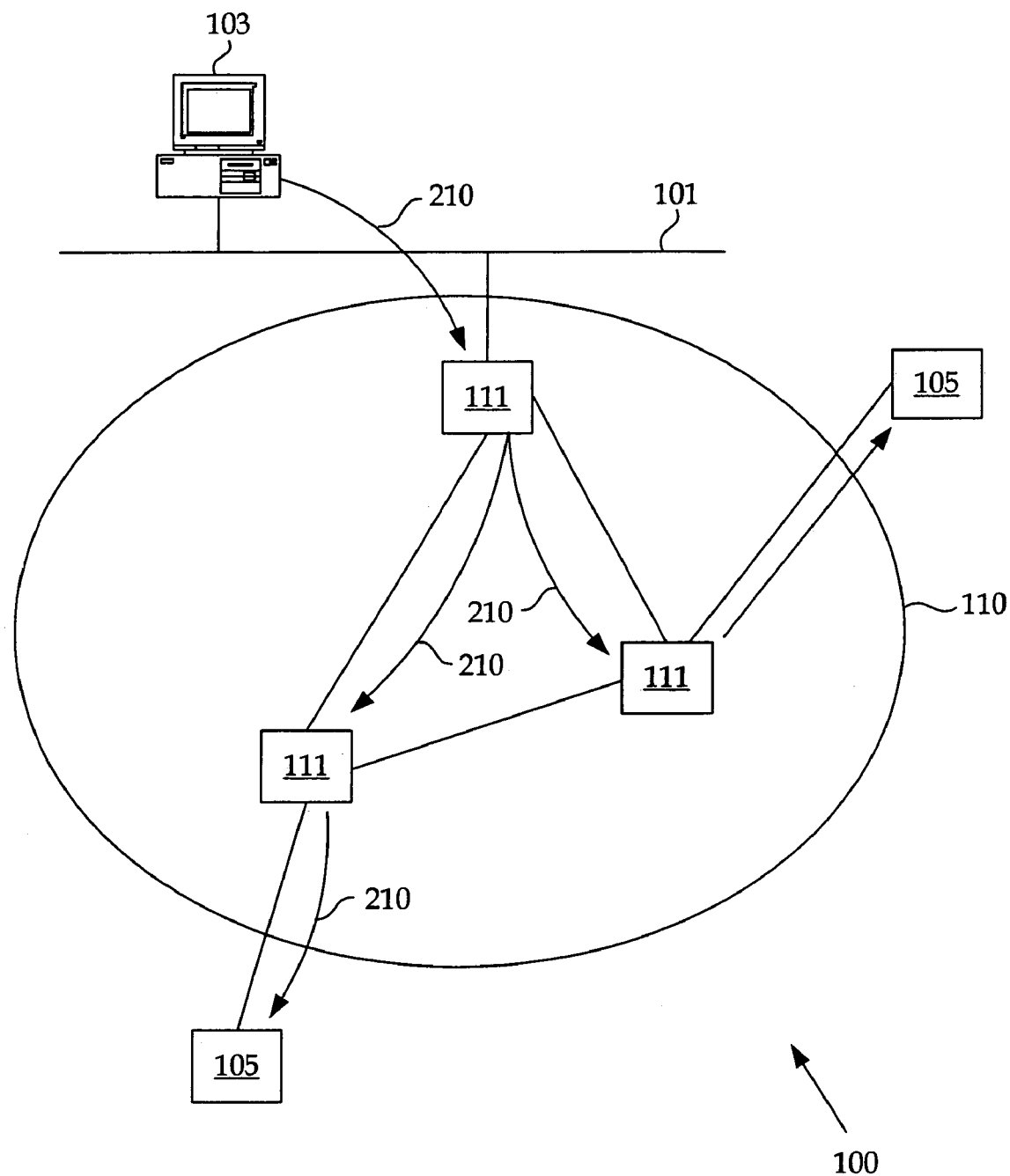
FIG. 2A shows a block diagram of a system for providing synchronized message receipt in a computer network.
Figure 2B:
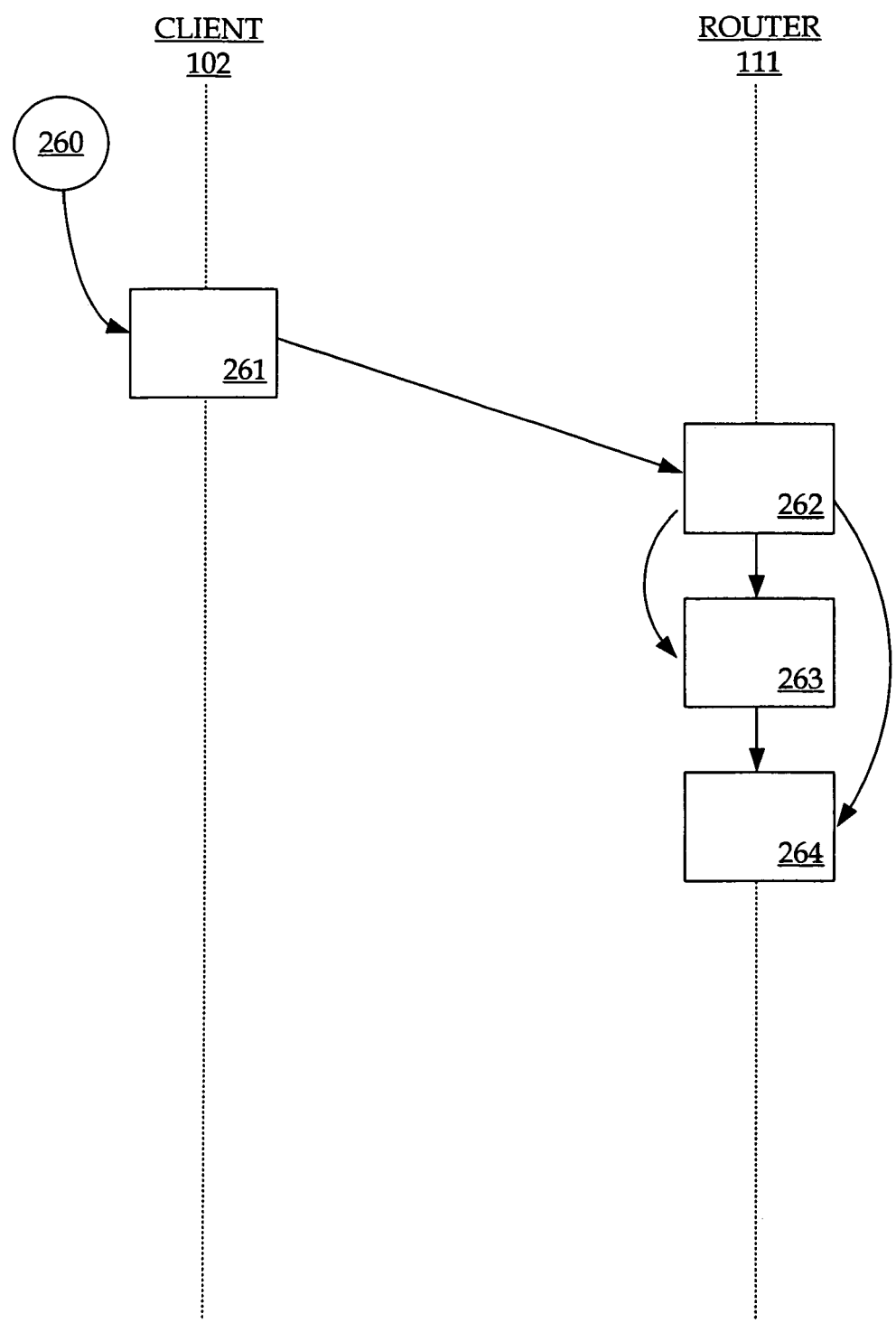
FIG. 2B shows a flow diagram of a method for providing synchronized message receipt in a computer network as shown in FIG. 2A.

FIG. 2A shows a block diagram of a system for providing synchronized message receipt in a computer network. FIG. 2B shows a flow diagram of a method for providing synchronized message receipt in a computer network as shown in FIG. 2A.

A second example enhanced network service is synchronized distribution of messages to recipients, such as (1) assuring that a designated message is delivered to a recipient node on the internetwork 100 at a designated time, or (2) assuring that a designated message is delivered to multiple recipients at the same time.

In this example enhanced service, a message is labeled with a set of designated destination nodes and a designated time for delivery to those destination nodes. For example, the message may comprise one of the following:

- a financial news report, such as a ticker-tape entry which is intended for delivery to customers fifteen minutes after its occurrence in real time; or
- a wake-up call or other reminder, such as a greeting message which is intended for delivery at a time specified by the recipient.

In a preferred embodiment, each one of the routers 111 maintains an indicator of the current time, synchronized across all routers 111 so that any pair of routers 111 will have the same value for the "current time", preferably within an error margin of less than about 0.5 milliseconds. This indicator may be recorded in the network tables 112 or in another register within each router 111. The routers 111 may maintain this indicator by means of a network time protocol, or by some other technique. Network time protocols, which are preferred, are known in the art of networking.

A method 250 is conducted in cooperation by the client process 102 and various routers 111 on the internetwork 100. At a flow point 260 for the method 250, the client process 102 desires to send a message 200 for receipt at a destination node 201 at a designated time.

At a step 261, the client process 102 contacts one of the routers 111 using a timed message 210. Since all messages on the internetwork 100, other than those limited to the local network 101, are transmitted using one or more routers 111, the client process 102 need only transmit the timed message 210 to the destination node 201 as if it were to transmit any other message to the destination node 201, and the timed message 210 will be received by one of the routers 111 along a path to the destination node 201. The timed message 210 comprises an ordinary message for delivery to, plus a header designating the desired time for receipt at, the destination node 201.

At a step 262, one of the routers 111 along a path to the destination node 201 receives the timed message 210 and parses it to determine the destination node 201, and determines if it would be one of the routers 111 to effect final delivery of the message to the destination node 201. If there is a single destination node 201, there will be only one such router 111; if there are multiple destination nodes 201, there may be more than one such router 111. If this router 111 would not effect final delivery, the method 250 continues with the step 263; if this router 111 would effect final delivery, the method 250 continues with the step 264.

At a step 263 (the router 111 would not effect final delivery), the router 111 forwards the timed message 210 to the next router 111 in the path to the destination node 201, just like any other message. In a preferred embodiment, if the desired time for receipt is very soon, the router 111 may reply to the client process 102 with an error message, indicating that delivery at the designated time is impossible, unlikely, or merely not guaranteed. In alternative embodiments, if the desired time for receipt is very soon, the router 111 may give priority to the timed message 210 over other messages.

At a step 264 (the router 111 would effect final delivery), the router 111 holds the timed message 210 until the designated time for delivery to the destination node 201, and at that time, delivers the message just like any other message. In a preferred embodiment, if the current time is past the desired time for receipt, the router 111 may reply to the client process 102 with an error message, indicating that delivery at the designated time did not occur, and may either discard the message or deliver it late. In alternative embodiments, if the desired time for receipt is very soon, the router 111 may give priority to the timed message 210 over other messages.

In a preferred embodiment, the capability to send a timed message 210 may be restricted to those client processes 102 with sufficient authorization. In such a case, the first router 111 to receive and parse a timed message 210 would require that the client process 102 is authenticated, to determine that the timed message 210 really comes from the client process 102 and not someone else, and that the client process 102 has sufficient permissions, i.e., that the router 111 has been informed that the client process 102 is authorized to send timed messages 210.

Enhanced Services Using Server Advertisements

FIG. 1A also shows a block diagram of a system for providing enhanced services using server advertisements, in a computer network. FIG. 1B also shows a flow diagram of a method for providing enhanced services using server advertisements, in a computer network as shown in FIG. 1A.

In a preferred embodiment, the method 150 is supplemented by using information "advertised" by the server processes 104. At a flow point 170 for the supplemented method 150, one of the server processes 104 desires to disseminate server advertising information to the subnet 110 of routers 111 for use with an enhanced network service.

The server advertising information comprises any information provided by one of the server processes 104 for dissemination to the subnet 110 of routers 111. For example, server advertising information may comprise the following:
  relative load at the server node;
  resources available at the server node, such as what services are available and to which classes of client process 102 those services are available, amount of free mass storage space or free processor time;
  services available at the server node, to which classes of users those services are available, cost for performing those services, expected delay in performing those services, or other administrative policies which could affect the choice of server process 104 by a client process 102; or
  which persons are logged in at the server node 105.

At a step 171, one of the server processes 104 sends a server-info message 131 to one of the routers 111.

The routing technique is supplemented by providing that each one of the routers 111 disseminates information from the server-info message 131 to all routers 111 in the subnet 110. Each router 111 which receives the server-info message 131 performs the steps 172, 173, and 174. As a result, each router 111 eventually receives the information to be disseminated in the server-info message 131 and stores that information in its network tables 112.

At a step 172, the router 111 receives the server-info message 131 and parses the server-info message 131 to determine the information to be disseminated.

At a step 173, the router 111 stores the information to be disseminated in its network tables 112.

At a step 174, the router 111 forwards the information to be disseminated to a set of neighboring routers 111 in the subnet 110.

In the supplemented method 150, the step 164 is supplemented to determine the order for the network addresses responsive to the server advertising information. Thus for example, at the step 164 the router 111 orders the network addresses responsive to relative load on the server node 105, or responsive to both relative distance to the server node 105 and relative load on the server node 105.

In other enhanced network services, the routers 111 may route messages to server processes 104 responsive to the server advertising information. For a first example, the server advertising information may comprise a list of persons who are currently logged in at the server node 105, and the routers 111 may receive and route a person-to-person message naming a designated person to the server node 105 at which that designated person is logged in. For a second example, the server advertising information may comprise a set of administrative policies regarding traffic the server node 105 desires not to retransmit, and the routers 111 may receive and route such messages away from such server nodes 105.

Enhanced Services Using Both Client and Server Advertisements

Figure 3A:
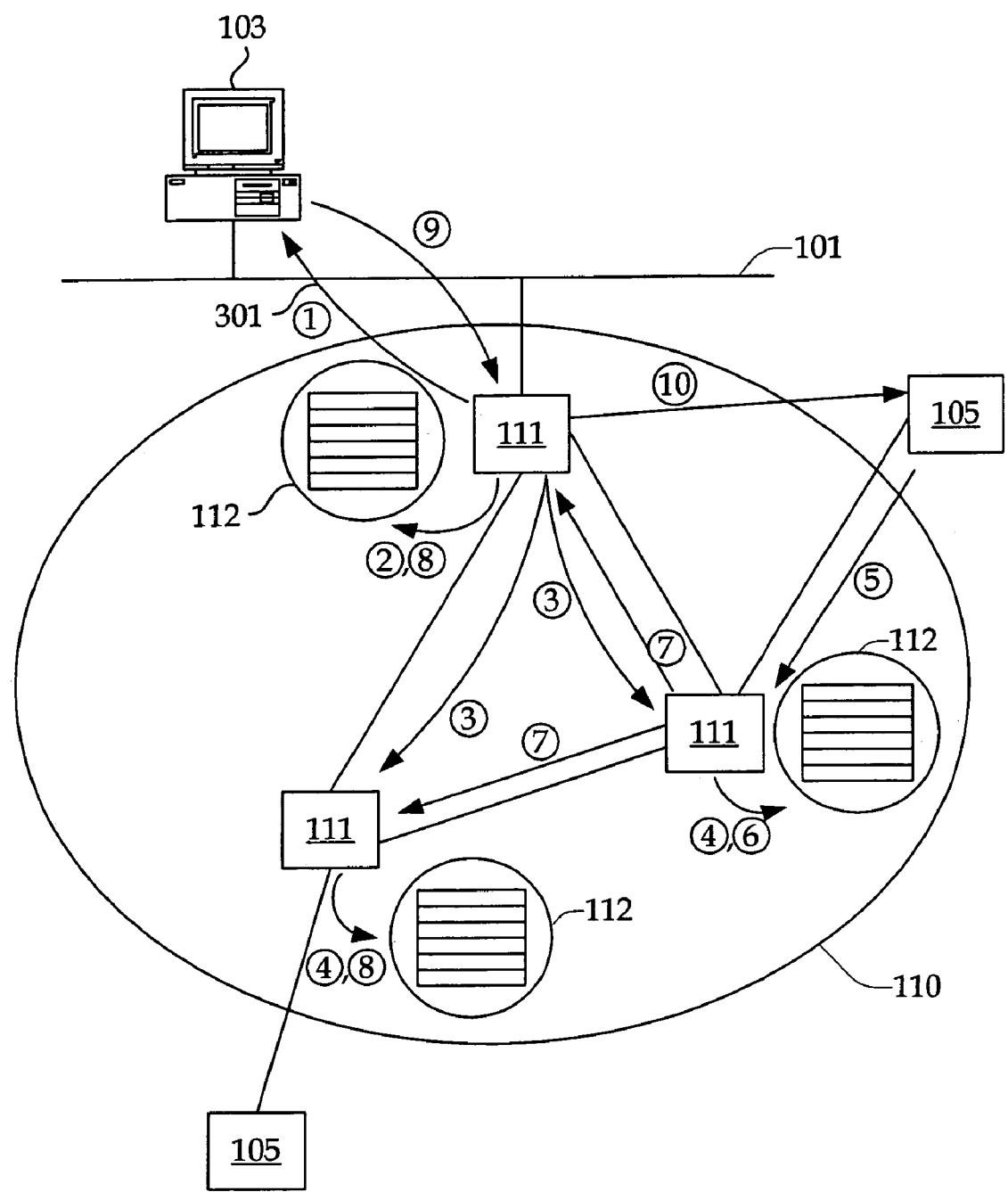
FIG. 3A shows a block diagram of a system for providing enhanced services using both client and server advertisements, in a computer network.
Figure 3B:
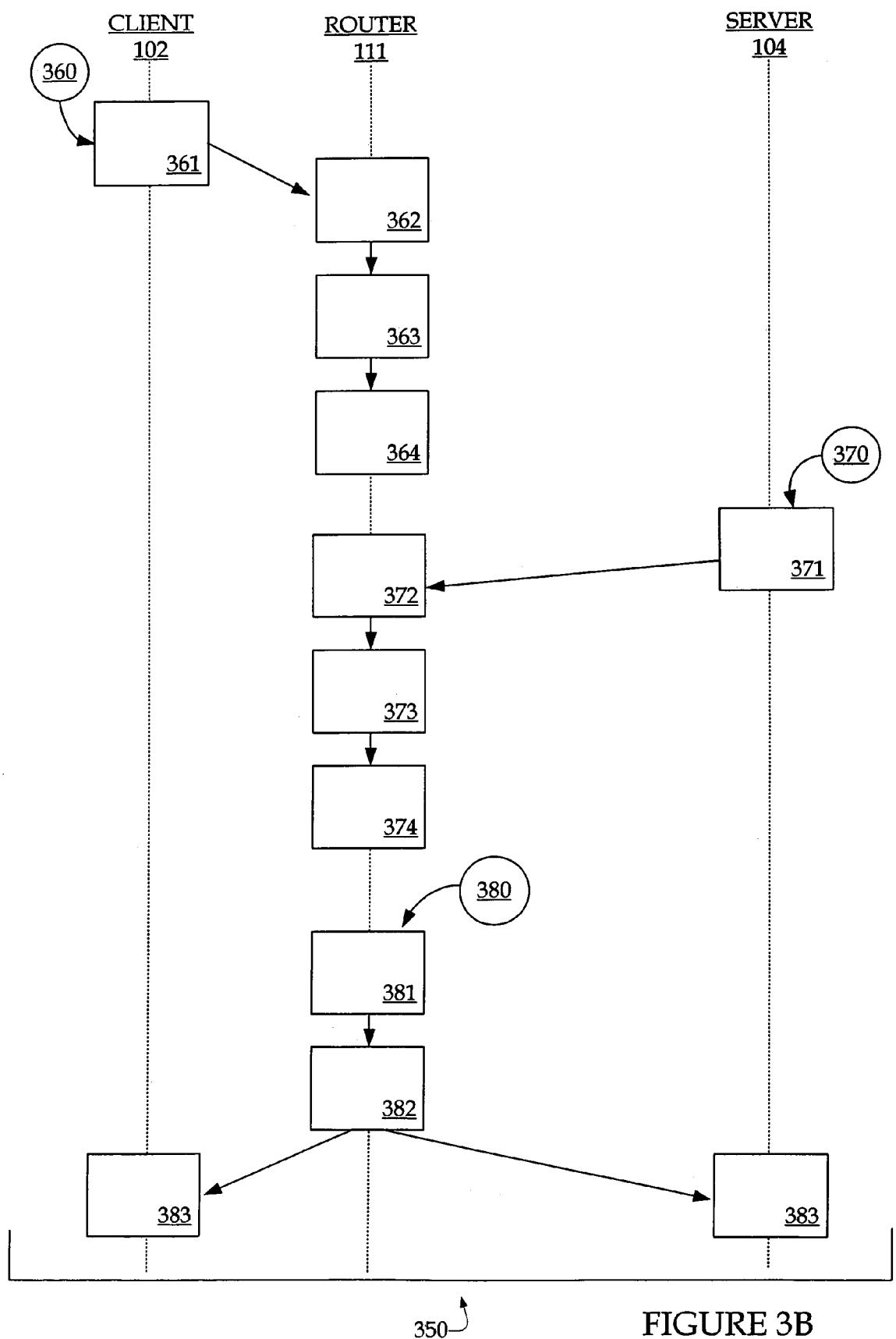
FIG. 3B shows a flow diagram of a method for providing enhanced services using both client and server advertisements, in a computer network as shown in FIG. 3A.

FIG. 3A shows a block diagram of a system for providing enhanced services using both client and server advertisements, in a computer network. FIG. 3B shows a flow diagram of a method for providing enhanced services using both client and server advertisements, in a computer network as shown in FIG. 3A.

A method 350 is conducted in cooperation by various client processes 102, client nodes 103, server processes 104, and server nodes 105 and coupled to the internetwork 100.

At a flow point 360 for the method 350, the client process 102 desires to disseminate client advertising information to the subnet 110 of routers 111 for use with an enhanced network service.

The client advertising information comprises any information provided by one of the client processes 102 for dissemination to the subnet 110 of routers 111. For example, client advertising information may comprise the following:
  relative urgency of requests from the client process 102; or
  willingness to pay for services from the server node 105.

At a step 361, one of the client processes 102 sends a client-info message 301 to one of the routers 111, similar to the step 171.

The routing technique is supplemented by providing that each one of the routers 111 disseminates information from the client-info message 301 to all routers 111 in the subnet 110. Each router 111 which receives the client-info message 301 performs the steps 362, 363, and 364. As a result, each router 111 eventually receives the information to be disseminated in the client-info message 301 and stores that information in its network tables 112.

At a step 362, the router 111 receives the client-info message 301 and parses the client-info message 301 to determine the information to be disseminated, similar to the step 172.

At a step 363, the router 111 stores the information to be disseminated in its network tables 112, similar to the step 173.

At a step 364, the router 111 forwards the information to be disseminated to a set of neighboring routers 111 in the subnet 110, similar to the step 174.

At a flow point 370 for the method 350, the server process 102 desires to disseminate server advertising information to the subnet 110 of routers 111 for use with an enhanced network service.

The routing technique is also supplemented by providing that each one of the routers 111 disseminates information from the server-info message 131 to all routers 111 in the subnet 110, similar to the supplemented method 150. Each router 111 which receives the server-info message 131 performs the steps 372, 373, and 374. As a result, each router 111 eventually receives the information to be disseminated in the server-info message 131 and stores that information in its network tables 112.

At a step 372, the router 111 receives the server-info message 131 and parses the server-info message 131 to determine the information to be disseminated, similar to the step 172.

At a step 373, the router 111 stores the information to be disseminated in its network tables 112, similar to the step 173.

At a step 374, the router 111 forwards the information to be disseminated to a set of neighboring routers 111 in the subnet 110, similar to the step 174.

At a flow point 380, one of the routers 111 receives both client advertising information and server advertising information.

At a step 381, the router 111 matches the client advertising information against the server advertising information.

The nature of this step 381 depends on the nature of the client advertising information and the server advertising information. For example, if the client advertising information indicates the desire to obtain a named service X for a price Y or less, and the server advertising information indicates the ability to provide the named service X for a price Y or more, the router 111 obtains a match. Other situations in which the router 111 might obtain a match include the following:

- the client process 102 has an indicated degree of urgency and the server process 104 has an indicated degree of expected delay to perform the named service;
- the client process 102 has an indicated priority and the server process 104 has an indicated degree of free capacity to perform the named service;
- the client process 102 has an indicated set of server requirements and the server process 104 has an indicated set of server capabilities to perform the named service;
- the client process 102 has an indicated set of subtasks of the named service to be performed and the server process 104 has an indicated set of subtasks of the named service it is capable of performing; or
- the client process 102 has an indicated set of products or services a first associated user desires to obtain and the server process 104 has an indicated set of products or services a second associated user desires to provide, such as for example airline tickets, computer equipment, office supplies, stocks or other securities, or other products or services.

At a step 382, the router 111 transmits a client-match message 302 to the client process 102, and a server-match message 303 to the server process 104, indicating the nature of the match.

At a step 383, the client process 102 and the server process 104 communicate about the matched information.

Authenticated Remote Procedure Call Transport

Figure 4A:
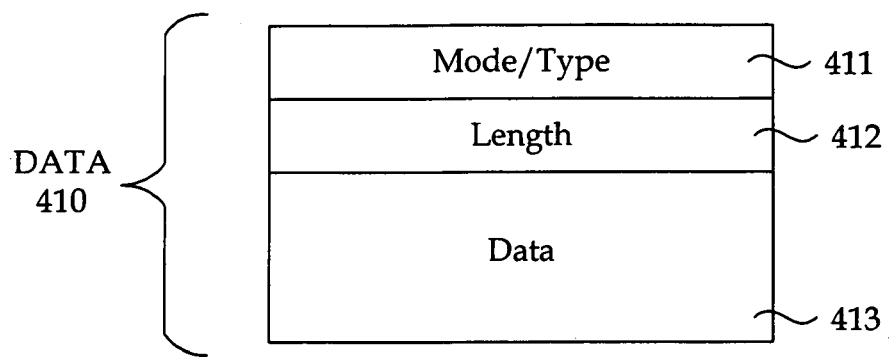
FIG. 4A shows formats for a set of packets for use with an authenticated remote procedure call transport ("ART") protocol.
Figure 4A:
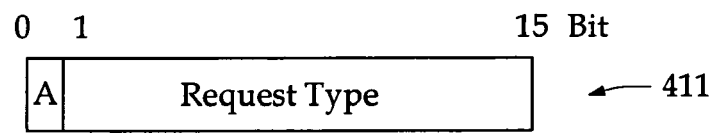
Figure 4A:
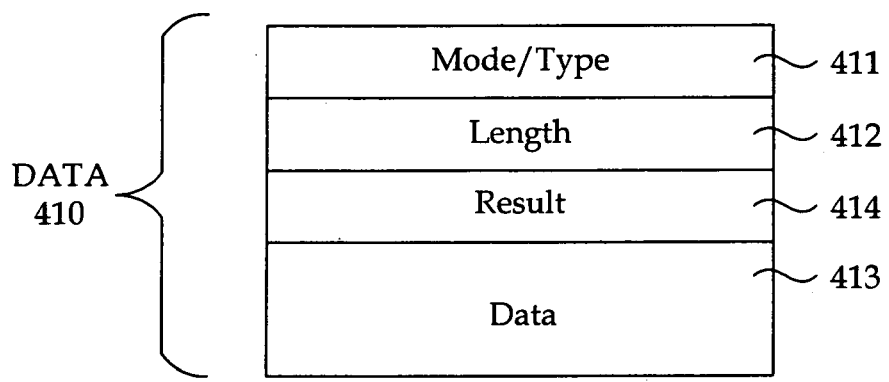
Figure 4A:
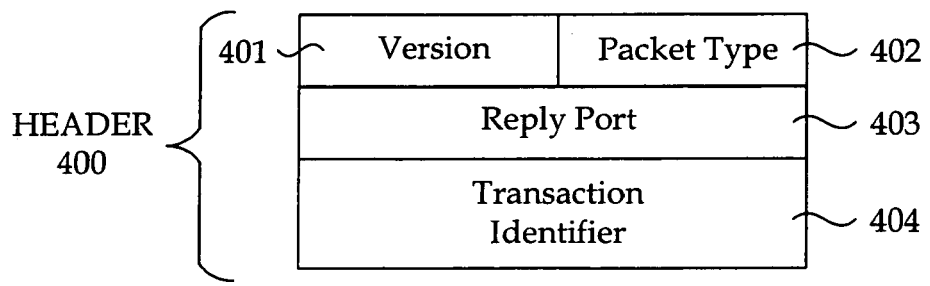
Figure 4B:
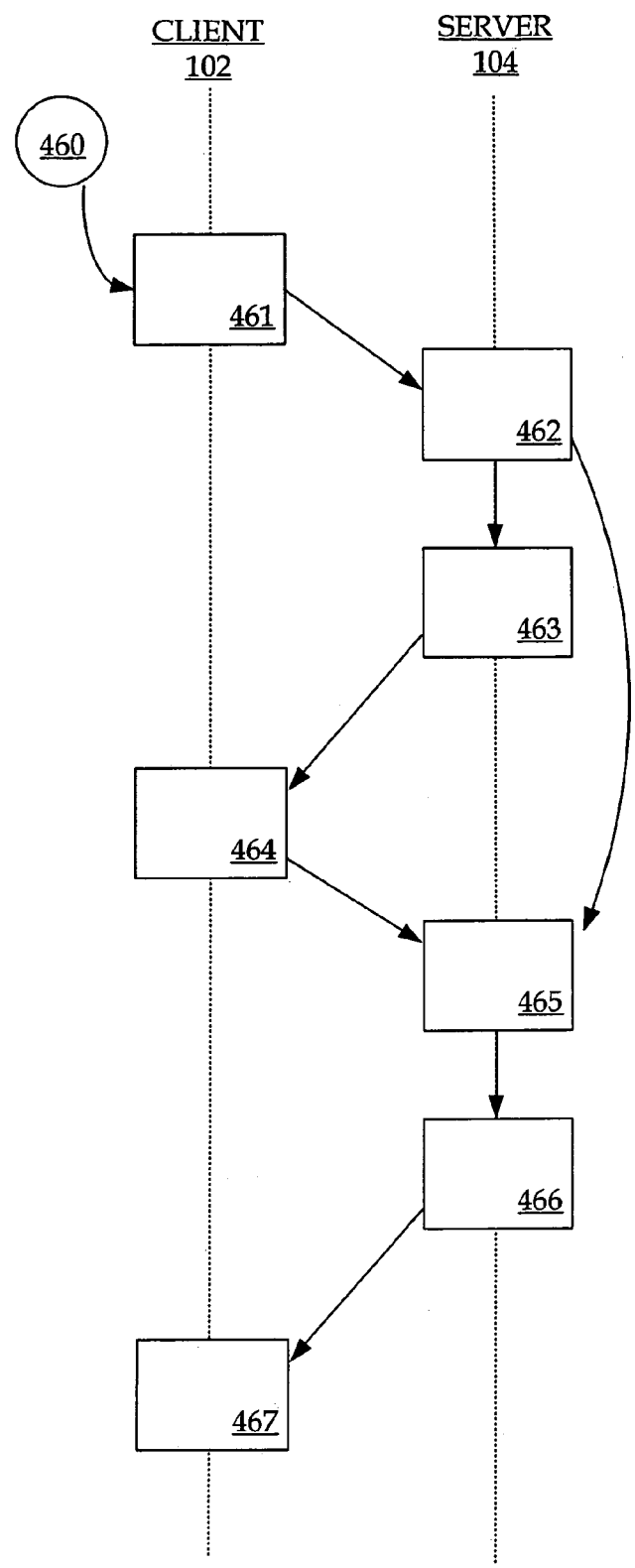
FIG. 4B shows a flow diagram for an authenticated remote procedure call transport protocol.

FIG. 4A shows formats for a set of packets for use with an authenticated remote procedure call transport ("ART") protocol. FIG. 4B shows a flow diagram for an authenticated remote procedure call transport protocol.

The ART protocol described herein comprises four types of packets: (1) an ART-request packet, indicating a request for a service to be performed at the remote site, (2) an ART-reply packet, indicating a response to the ART-request packet, (3) an ART-auth-challenge packet, indicating a challenge to the recipient to show that the recipient is authorized to make the request, and (4) an ART-auth-response packet, indicating a response to the authorization challenge.

A single transaction comprises the sequence (1) ART-request, (2) ART-reply. If authentication is performed, a single transaction comprises the sequence (1) ART-request, (2) ART-auth-challenge, (3) ART-auth-response, (4) ART-reply.

All four types of packet comprise a fixed length packet header 400 and variable length packet data 410. The packet header 400 comprises a version number 401, a packet type value 402, a reply port value 403, and a transaction identifier 404.

The version number 401 comprises one octet (eight-bit byte) specifying the version of the remote procedure call protocol.

The packet type value 402 comprises one octet specifying the type of operation the packet is for. In a preferred embodiment, a request packet has the value 1; a reply packet has the value 2; an authentication challenge packet has the value 3; an authentication response packet has the value 4.

The reply port value 403 comprises two octets specifying a 16-bit value of the port at which the client process 102 expects to receive further ART protocol packets. The client sets this value with its first ART-request packet; thereafter the client and server copy this value to all packets for a single ART transaction.

The transaction identifier 404 comprises four octets specifying a 32-bit unsigned integer identifier for a single transaction. The client sets this value with its first ART-request packet for each transaction; thereafter the client and server copy this value to all packets for a single ART transaction. In a preferred embodiment, the client chooses a random nonzero value for its first ART transaction and increments this value by one for each subsequent ART transaction; zero is a valid value which may occur by overflow.

For the ART-request packet, the variable length packet data 410 comprises one or more requests. Each request comprises a mode/type field 411, a length value 412, and a data field 413.

The mode/type field 411 comprises two octets specifying a one-bit authentication bit and a 15-bit request type.

The length value 412 comprises two octets specifying a 16-bit count of the number of octets in the data field 413.

The data field 413 comprises the actual data for the request. Its interpretation may vary depending on the type of request.

For the ART-auth-challenge packet, the variable length packet data 410 comprises one or more challenges, one for each request in the ART-request packet requiring authorization. Each challenge comprises the mode/type field 411, the length value 412, and the data field 413, formatted like those for requests in the ART-request packet.

The server copies the mode/type field 411 from the mode/type field 411 for the ART-request packet.

The data field 413 comprises a randomly chosen challenge value.

For the ART-auth-response packet, the variable length packet data 410 comprises one response for each challenge in the ART-auth-challenge packet. Each response comprises the mode/type field 411, the length value 412, and the data field 413, formatted like those in the ART-request packet.

The client copies the mode/type field 411 from the mode/type field 411 for the ART-auth-challenge packet.

The data field 413 comprises the response value appropriate to the corresponding challenge value.

For the ART-reply packet, the variable length packet data 410 comprises one reply for each request in the ART-request packet. Each reply comprises the mode/type field 411, the length value 412, and the data field 413, formatted like those in the ART-request packet, and a result field 414.

The server copies the mode/type field 411 from the mode/type field 411 for the ART-request packet.

The result field 414 comprises two octets specifying a 16-bit value indicating the success or failure of the corresponding request. If the request is successful, the value will be zero. If the request is not successful, the value will be nonzero, and particular nonzero values may (at the server's option) indicate the type of failure.

The ART protocol 450 is conducted in cooperation by the client process 102 and the server process 104. At a flow point 460 for the method 450, the client process 102 desires to initiate one or more ART requests.

At a step 461, the client process 102 constructs an ART-request packet 470 for transmission to the server process 104, and transmits the ART-request packet 470 to the server process 104. The ART-request packet 470 comprises one or more requests, as described above. The client process 102 sets a timer to protect against the possibility that the packet will be lost. A preferred timer value is 30 seconds. If no reply is received, the client process 102 retries the request, up to five times. ART requests are therefore preferably idempotent.

At a step 462, the server process 104 receives the ART-request packet 470 and parses the ART-request packet 470 to determine each of the requests. If authentication is required for one or more of the requests, the protocol 450 continues with the step 463. If authentication is not required for any of the requests, the protocol 450 continues with the step 465. It is possible that authentication will be required for some but not all of the requests in a single ART-request packet 470.

At a step 463, the server process 104 constructs an ART-auth-challenge packet 471 for transmission to the client process 102, and transmits the ART-auth-challenge packet 471 to the client process 102. The server process 104 sets a timer to protect against the possibility that the packet will be lost. A preferred timer value is 30 seconds. If no response to the challenge is received, the server process 104 need not retry the challenge.

At a step 464, the client process 102 receives the ART-auth-challenge packet 471 from the server process 104, parses the ART-auth-challenge packet 471 to determine the challenge data, determines the appropriate authorization response, constructs an ART-auth-response packet 472 for transmission to the server process 104, and transmits the ART-auth-response packet 472 to the server process 104. The client process 104 sets a timer to protect against the possibility that the packet will be lost. A preferred timer value is 30 seconds. If no reply to the original request is received, the client process 104 retries the original request, up to file times.

A preferred embodiment uses the shared secret model of authentication, as described in RFC-1344, hereby incorporated by reference as if fully set forth herein. The server process 104 generates a random challenge value for each request requiring authentication; the client process 102 and server process 104 each compute a hash function applied to the concatenation of the challenge value and the shared secret. A preferred embodiment uses the MD5 hash function, as described in RFC-1321, hereby incorporated by reference as if fully set forth herein. The client process 102 transmits the computed value as the response value to the server process 104, which matches the response value against its own computed value. Authentication succeeds if the response value matches the server's own computed value.

Those skilled in the art will recognize, after perusal of this application, that other and further types of authentication may be used instead or in addition.

At a step 465, the server process 104 receives the ART-auth-response packet 472 from the client process 102, parses the ART-auth-response packet 472 to determine the response data, and determines whether the authorization challenge was passed by the response. If the client process 102 passed the authorization challenge, the server process 104 performs the request, and the protocol continues with the step 466. If the client process 102 failed to pass the authorization challenge, the server process 104 generates an failed-authorization error, and the protocol continues with the step 466.

At a step 466, the server process 104 constructs an ART-reply packet 473 for transmission to the client process 102, and transmits the ART-reply packet 473 to the client process 102.

At a step 467, the client process 102 receives the ART-reply packet 473 from the server process 104 and parses the ART-reply packet 473 to determine the reply for each request. The client process 102 matches the transaction identifier for the ART-reply packet 473 to a list of outstanding requests; if there is no match, the client process 102 discards the ART-reply packet 473.

ALTERNATIVE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. A method for providing enhanced services in a computer network, said method comprising:
   receiving at a first network device a first server information message originating from a first server node;
   wherein the first server information message includes first server information relating to one or more of the following: (a) information relating to at least one load condition at the first server node, (b) information relating to at least one resource available at the first server node, (c) information relating to at least one service available at the server node, (d) information relating to an identity of at least one person which is logged in at the server node, or combinations thereof;
   analyzing the first server information; and
   performing a first action based upon the analysis of the first server information.

2. The method of claim 1 wherein the first server information message includes information relating to at least one load condition at the first server node.

3. The method of claim 1 wherein the first server information message includes information relating to at least one resource available at the first server node.

4. The method of claim 1 wherein the first server information message includes information relating to at least one service available at the server node.

5. The method of claim 1 wherein the first server information message includes information relating to an identity of at least one person which is logged in at the server node.

6. The method of claim 1 wherein a first portion of the first server information includes application-level information.

7. The method of claim 1 wherein the first server information message includes server resource information relating to at least one resource available at the first server node; and
   wherein the server resource information includes one or more of the following: (i) information relating to services that are available at the first server node, (ii) information relating to at least one class of client processes which is permitted to use at least one specified service at the first server node, (iii) information relating to available storage space at the first server node, (iv) information relating to available processor time at the first server node, or combinations thereof.

8. The method of claim 1 wherein the first server information message includes server service information relating to at least one service available at the first server node; and
   wherein the server service information includes one or more of the following: (i) information relating to at least one class of user which is permitted to use at least one specified service at the first server node, (ii) information relating to at least one cost for performing a specified service at the first server node, (iii) information relating to an expected delay in performing the specified service, (iv) information relating to administrative policies at the first server node which affect a choice of server process by a client process, or combinations thereof.

9. The method of claim 1 further comprising establishing a preferred ordering of a first plurality of network addresses in response to the analysis of the first server information.

10. The method of claim 1 wherein the first action includes routing a first message to the first server node in response to the analysis of the first server information.

11. The method of claim 1 wherein the first server information includes information relating to an identity of a first person who is logged in at the first server node; and
wherein the first action includes routing a person-to-person message to the first person identified at the first server node.

12. The method of claim 1 wherein the first server information includes information relating to a first administrative policy regarding a first traffic type which the first server node desires not to retransmit; and
wherein the first action includes routing traffic associated with the first traffic type away from the first server node.

13. The method of claim 1 further comprising disseminating the first server information to a first plurality of routers in the network.

14. The method of claim 1 wherein the first network device corresponds to a first router, and wherein the method further comprises:
generating, at the first server node, the first server information message; and
transmitting the first server information message to the first router.

15. A method for providing enhanced services in a computer network, said method comprising:
receiving at a first network device a first client message originating from a first client node;
wherein the first client message includes first client information relating to one or more of the following: (a) information relating to at least one preferred load condition at a server node, (b) information relating to at least one desired resource available at a server node, (c) information relating to at least one desired service available at a server node, (d) information relating to an identity of at least one person which is logged in at a server node; (e) information relating to an urgency of a client request associated with the first client message, (f) information relating to a willingness to pay for desired services provided by a server node, or combinations thereof;
analyzing the first client information; and
performing a first action based upon the analysis of the first client information.

16. The method of claim 15 wherein the first client information includes information relating to a preferred load condition at a server node.

17. The method of claim 15 wherein the first client information includes information relating to at least one desired resource available at a server node.

18. The method of claim 15 wherein the first client information includes information relating to at least one desired service available at a server node.

19. The method of claim 15 wherein the first client information includes information relating to an identity of at least one person which is logged in at a server node.

20. The method of claim 15 wherein the first client information includes information relating to an urgency of a client request associated with the first client message.

21. The method of claim 15 wherein the first client information includes information relating to a willingness to pay for a desired service provided by a server node.

22. The method of claim 15 wherein a first portion of the first client information includes application-level information.

23. The method of claim 15 further comprising disseminating the first client information to a first plurality of routers in the network.

24. The method of claim 15 wherein the first network device corresponds to a first router, and wherein the method further comprises:
generating, at the first client node, the first client message; and
transmitting the first client message to the first router.

25. A system for providing enhanced services in a computer network, said system comprising:
at least one processor;
at least one interface configured or designed to provide a communication link to at least one other network device in the data network; and
memory;
the system being configured or designed to receive at a first network device a first server information message originating from a first server node;
wherein the first server information message includes first server information relating to one or more of the following: (a) information relating to at least one load condition at the first server node, (b) information relating to at least one resource available at the first server node, (c) information relating to at least one service available at the server node, (d) information relating to an identity of at least one person which is logged in at the server node, or combinations thereof;
the system being configured or designed to analyze the first server information; and
the system being configured or designed to perform a first action based upon the analysis of the first server information.

26. The system of claim 25 wherein the first server information message includes information relating to at least one load condition at the first server node.

27. The system of claim 25 wherein the first server information message includes information relating to at least one resource available at the first server node.

28. The system of claim 25 wherein the first server information message includes information relating to at least one service available at the server node.

29. The system of claim 25 wherein the first server information message includes information relating to an identity of at least one person which is logged in at the server node.

30. The system of claim 25 wherein a first portion of the first server information includes application-level information.

31. The system of claim 25 wherein the first server information message includes server resource information relating to at least one resource available at the first server node; and
wherein the server resource information includes one or more of the following: (i) information relating to services that are available at the first server node, (ii) information relating to at least one class of client processes which is permitted to use at least one specified service at the first server node, (iii) information relating to available storage space at the first server node, (iv) information relating to available processor time at the first server node, or combinations thereof.

32. The system of claim 25 wherein the first server information message includes server service information relating to at least one service available at the first server node; and wherein the server service information includes one or more of the following: (i) information relating to at least one class of user which is permitted to use at least one specified service at the first server node, (ii) information relating to at least one cost for perform a specified service at the first server node, (iii) information relating to an expected delay in perform the specified service, (iv) information relating to administrative policies at the first server node which affect a choice of server process by a client process, or combinations thereof.

33. The system of claim 25 being further configured or designed to establish a preferred ordering of a first plurality of network addresses in response to the analysis of the first server information.

34. The system of claim 25 being configured or designed to route a first message to the first server node in response to the analysis of the first server information.

35. The system of claim 25 wherein the first server information includes information relating to an identity of a first person who is logged in at the first server node; and wherein the first action includes routing a person-to-person message to the first person identified at the first server node.

36. The system of claim 25 wherein the first server information includes information relating to a first administrative policy regarding a first traffic type which the first server node desires not to retransmit; and wherein the first action includes routing traffic associated with the first traffic type away from the first server node.

37. The system of claim 25 being further configured or designed to disseminate the first server information to a first plurality of routers in the network.

38. The system of claim 25 wherein the first network device corresponds to a first router; and wherein the fist server node is configured or designed to:
generate the first server information message; and
transmit the first server information message to the first router.

39. A system for providing enhanced services in a computer network, said system comprising:

at least one processor;
at least one interface configured or designed to provide a communication link to at least one other network device in the data network; and
memory;
the system being configured or designed to receive at a first network device a first client message originating from a first client node;
wherein the first client message includes first client information relating to one or more of the following: (a) information relating to at least one preferred load condition at a server node, (b) information relating to at least one desired resource available at a server node, (c) information relating to at least one desired service available at a server node, (d) information relating to an identity of at least one person which is logged in at a server node; (e) information relating to an urgency of a client request associated with the first client message, (f) information relating to a willingness to pay for desired services provided by a server node, or combinations thereof;

the system being configured or designed to analyze the first client information; and the system being configured or designed to perform a first action based upon the analysis of the first client information.

40. The system of claim 39 wherein the first client information includes information relating to a preferred load condition at a server node.

41. The system of claim 39 wherein the first client information includes information relating to at least one desired resource available at a server node.

42. The system of claim 39 wherein the first client information includes information relating to at least one desired service available at a server node.

43. The system of claim 39 wherein the first client information includes information relating to an identity of at least one person which is logged in at a server node.

44. The system of claim 39 wherein the first client information includes information relating to an urgency of a client request associated with the first client message.

45. The system of claim 39 wherein the first client information includes information relating to a willingness to pay for a desired service provided by a server node.

46. The system of claim 39 wherein a first portion of the first client information includes application-level information.

47. The system of claim 39 being further configured or designed to disseminate the first client information to a first plurality of routers in the network.

48. The system of claim 39 wherein the first network device corresponds to a first router, and wherein the fist client node is configured or designed to:
generate the first client message; and
transmit the first client message to the first router.

49. A system for providing enhanced services in a computer network, said system comprising:

means for receiving at a first network device a first server information message originating from a first server node;

wherein the first server information message includes first server information relating to one or more of the following: (a) information relating to at least one load condition at the first server node, (b) information relating to at least one resource available at the first server node, (c) information relating to at least one service available at the server node, (d) information relating to an identity of at least one person which is logged in at the server node, or combinations thereof;

means for analyzing the first server information; and
means for performing a first action based upon the analysis of the first server information.

50. A system for providing enhanced services in a computer network, said system comprising:

means for receiving at a first network device a first client message originating from a first client node;

wherein the first client message includes first client information relating to one or more of the following: (a) information relating to at least one preferred load condition at a server node, (b) information relating to at least one desired resource available at a server node, (c) information relating to at least one desired service available at a server node, (d) information relating to an identity of at least one person which is logged in at a server node; (e) information relating to an urgency of a client request associated with the first client message, (f) information relating to a willingness to pay for desired services provided by a server node, or combinations thereof;

means for analyzing the first client information; and
means for performing a first action based upon the analysis of the first client information.

* * * * *